(12) United States Patent
Vasudevan et al.

(10) Patent No.: US 12,340,408 B2
(45) Date of Patent: Jun. 24, 2025

(54) METHOD AND SYSTEM FOR GENERATION OF DESCRIPTIVE COPY OF GROCERY PRODUCTS

(71) Applicant: Tata Consultancy Services Limited, Mumbai (IN)

(72) Inventors: Bagya Lakshmi Vasudevan, Chennai (IN); Sudesna Baruah, Chennai (IN); Mayur Patidar, Noida (IN); Meghna Kishor Mahajan, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 223 days.

(21) Appl. No.: 18/102,931

(22) Filed: Jan. 30, 2023

(65) Prior Publication Data

US 2024/0127309 A1    Apr. 18, 2024

(30) Foreign Application Priority Data

Oct. 12, 2022    (IN) .............................. 202221058411

(51) Int. Cl.
*G06Q 30/0601*    (2023.01)
*G06F 40/284*    (2020.01)

(52) U.S. Cl.
CPC ....... *G06Q 30/0627* (2013.01); *G06F 40/284* (2020.01)

(58) Field of Classification Search
CPC ... G06Q 30/00; G06Q 30/0627; G06F 40/284
See application file for complete search history.

(56) References Cited

U.S. PATENT DOCUMENTS 9,785,953 B2    10/2017 Desai et al.
10,360,495 B2    7/2019 Chapela et al.
(Continued)

FOREIGN PATENT DOCUMENTS

AU    2019253767 B2    11/2019

OTHER PUBLICATIONS

Simonite, Tom, "The Future of the Web Is Marketing Copy Generated by Algorithms", Wired, dated Apr. 18, 2022. (Year: 2022).*
(Continued)

*Primary Examiner* — Michael Misiaszek
(74) *Attorney, Agent, or Firm* — Finnegan, Henderson, Farabow, Garrett & Dunner, LLP

(57) ABSTRACT

E-commerce industry is currently expanding rapidly, worldwide. A process of generating product copy for grocery items, which is very challenging as food items, do not have features in common, unlike fashion products. A data associated with one or more grocery products is received as an input. The data is processed to obtain one or more sorted similar grocery products. One or more relevant attributes and allergen information associated with the one or more sorted similar grocery products are extracted. A vocabulary model is created based the one or more relevant attributes and the allergen information associated with the one or more sorted similar grocery products. The vocabulary model is validated based on one or more assigned weights on training data. The one or more descriptive copies associated with grocery products are generated by mapping the validated vocabulary model with the training data.

15 Claims, 4 Drawing Sheets

(56) References Cited

U.S. PATENT DOCUMENTS

| | | | |
|---|---|---|---|
| 2019/0290172 A1 | 9/2019 | Hadad et al. | |
| 2020/0257715 A1* | 8/2020 | Kim | G06Q 10/10 |
| 2021/0406993 A1* | 12/2021 | Sethi | G06N 3/084 |
| 2024/0029132 A1* | 1/2024 | Lin | G06N 3/042 |
| 2024/0144921 A1* | 5/2024 | Singh | G10L 15/1822 |

OTHER PUBLICATIONS

Kiani, Minal "12 steps to write product descriptions that sell faster", Apimio.com, dated Mar. 12, 2021. (Year: 2021).*

Selleslagh, Ben, "Generate product descriptions with GPT-3, A simple giude3 on generationg product descriptions fro your website using the OpenAI Python libray", Vextrix, dated Sep. 20, 2022. (Year: 2022).*

Attribute Value Generation from Product Title using Language Models. Kalyani Roy, Pawan Goyal, and Manish Pandey. In Proceedings of the 4th Workshop on e-Commerce and NLP, pp. 13-17, Online. Association for Computational Linguistics (Year: 2021).*

Automatic generation of pattern-controlled product description in e-commerce. T Zhang, J Zhang, C Huo, W Ren—The World Wide Web Conference, 2019—dl.acm.org (Year: 2019).*

* cited by examiner

METHOD AND SYSTEM FOR GENERATION OF DESCRIPTIVE COPY OF GROCERY PRODUCTS

PRIORITY CLAIM

This U.S. patent application claims priority under 35 U.S.C. § 119 to: India Application No. 202221058411, filed on Oct. 12, 2022. The entire contents of the aforementioned application are incorporated herein by reference.

TECHNICAL FIELD

This disclosure relates generally to cognitive retail solutions, and, more particularly, to method and system for generation of descriptive copy of grocery products.

BACKGROUND

E-commerce industry is currently expanding rapidly, worldwide. Along with its rapid expansion, it has seen many improvisations over the years. The improvisations include (a) making the e-commerce website or user interface (UI) more attractive for user friendly, (b) making all products available to making each and everything available on customer's doorstep via humans or machines. There are endless technological advances made in this area which have led to its rapid growth and expansion. Product description generation has been in development for some time. A lot of researchers are putting in efforts to make an algorithm capable of generating product copies or descriptions for various retail products like apparel, footwear, accessories etc.

The popular traditional approaches of copywriting include involvement of a human copywriter. The human copywriter must know every detail of a product to write a copy. Also, he or she needs to refer to some retailer specific guides, product ingredients, etc. to come up with some product specific description. Further, he/she needs to take care of grammatical errors and spellings while writing each copy which increases manual efforts, time, and cost. The process of generating product copy for grocery items, which is very challenging as all food items, do not have features in common, unlike fashion products.

SUMMARY

Embodiments of the present disclosure present technological improvements as solutions to one or more of the above-mentioned technical problems recognized by the inventors in conventional systems. For example, in one embodiment, a processor implemented method of generation of descriptive copy of grocery products is provided. The processor implemented method includes at least one of: receiving, via one or more hardware processors, data associated with one or more grocery products as an input; processing, via the one or more hardware processors, the data to obtain one or more sorted similar grocery products; extracting, via the one or more hardware processors, (a) one or more relevant attributes associated with each of the sorted similar grocery products from the one or more sorted similar grocery products, and (b) an allergen information associated with the one or more sorted similar grocery products; creating, via the one or more hardware processors, a vocabulary model based on (a) the one or more relevant attributes associated with each of the sorted similar grocery products from the one or more sorted similar grocery products, and (b) the allergen information associated with the one or more sorted similar grocery products; assigning, via the one or more hardware processors, one or more weights to a training data; validating, via the one or more hardware processors, the vocabulary model based on the one or more assigned weights on the training data to obtain an accurate match of a content of the vocabulary model; and generating, via the one or more hardware processors, one or more descriptive copies associated with the grocery product by mapping the validated vocabulary model with the training data based on a prompt received with the data as the input. The one or more sorted similar grocery products is sorted based on one or more attributes.

In an embodiment, the data associated with the one or more grocery products corresponds to (a) a product title, (b) a product description, and (c) an additional text information. In an embodiment, the additional text information associated with the one or more grocery products corresponds to description on an image of the one or more grocery products. In an embodiment, the one or more attributes corresponds to (a) a color, (b) ingredients, (c) flavors, and (d) texture of the grocery product. In an embodiment, the one or more relevant attributes is extracted based on one or more relevant terms associated with each of the sorted similar grocery products. In an embodiment, the allergen information associated with the one or more sorted similar grocery products corresponds to (a) sulfites, (b) a color, and (c) food additives. In an embodiment, the vocabulary model is trained by a generative pretrained transformer model (GPT-2) to obtain the training data based on the data associated with the one or more grocery products.

In another aspect, there is provided a system for generation of descriptive copy of grocery products. The system includes a memory storing instructions; one or more communication interfaces; and one or more hardware processors coupled to the memory via the one or more communication interfaces, wherein the one or more hardware processors are configured by the instructions to: receive, data associated with one or more grocery products as an input; process, the data to obtain one or more sorted similar grocery products; extract, (a) one or more relevant attributes associated with each of the sorted similar grocery products from the one or more sorted similar grocery products, and (b) an allergen information associated with the one or more sorted similar grocery products; create, a vocabulary model based on (a) the one or more relevant attributes associated with each of the sorted similar grocery products from the one or more sorted similar grocery products, and (b) the allergen information associated with the one or more sorted similar grocery products; assign, one or more weights to a training data; validate, the vocabulary model based on the one or more assigned weights on the training data to obtain an accurate match of a content of the vocabulary model; and generate, one or more descriptive copies associated with the grocery product by mapping the validated vocabulary model with the training data based on a prompt received with the data as the input. The one or more sorted similar grocery products is sorted based on one or more attributes.

In an embodiment, the data associated with the one or more grocery products corresponds to (a) a product title, (b) a product description, and (c) an additional text information. In an embodiment, the additional text information associated with the one or more grocery products corresponds to description on an image of the one or more grocery products. In an embodiment, the one or more attributes corresponds to (a) a color, (b) ingredients, (c) flavors, and (d) texture of the grocery product. In an embodiment, the one or more relevant attributes is extracted based on one or more relevant terms associated with each of the sorted similar grocery products. In an embodiment, the allergen information associated with the one or more sorted similar grocery products corresponds to (a) sulfites, (b) a color, and (c) food additives. In an embodiment, the vocabulary model is trained by a generative pretrained transformer model (GPT-2) to obtain the training data based on the data associated with the one or more grocery products.

In yet another aspect, there are provided one or more non-transitory machine readable information storage mediums comprising one or more instructions which when executed by one or more hardware processors causes at least one of: receiving, data associated with one or more grocery products as an input; processing, the data to obtain one or more sorted similar grocery products; extracting, (a) one or more relevant attributes associated with each of the sorted similar grocery products from the one or more sorted similar grocery products, and (b) an allergen information associated with the one or more sorted similar grocery products; creating, a vocabulary model based on (a) the one or more relevant attributes associated with each of the sorted similar grocery products from the one or more sorted similar grocery products, and (b) the allergen information associated with the one or more sorted similar grocery products; assigning, one or more weights to a training data; validating, the vocabulary model based on the one or more assigned weights on the training data to obtain an accurate match of a content of the vocabulary model; and generating, one or more descriptive copies associated with the grocery product by mapping the validated vocabulary model with the training data based on a prompt received with the data as the input. The one or more sorted similar grocery products is sorted based on one or more attributes.

In an embodiment, the data associated with the one or more grocery products corresponds to (a) a product title, (b) a product description, and (c) an additional text information. In an embodiment, the additional text information associated with the one or more grocery products corresponds to description on an image of the one or more grocery products. In an embodiment, the one or more attributes corresponds to (a) a color, (b) ingredients, (c) flavors, and (d) texture of the grocery product. In an embodiment, the one or more relevant attributes is extracted based on one or more relevant terms associated with each of the sorted similar grocery products. In an embodiment, the allergen information associated with the one or more sorted similar grocery products corresponds to (a) sulfites, (b) a color, and (c) food additives. In an embodiment, the vocabulary model is trained by a generative pretrained transformer model (GPT-2) to obtain the training data based on the data associated with one or more grocery products.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
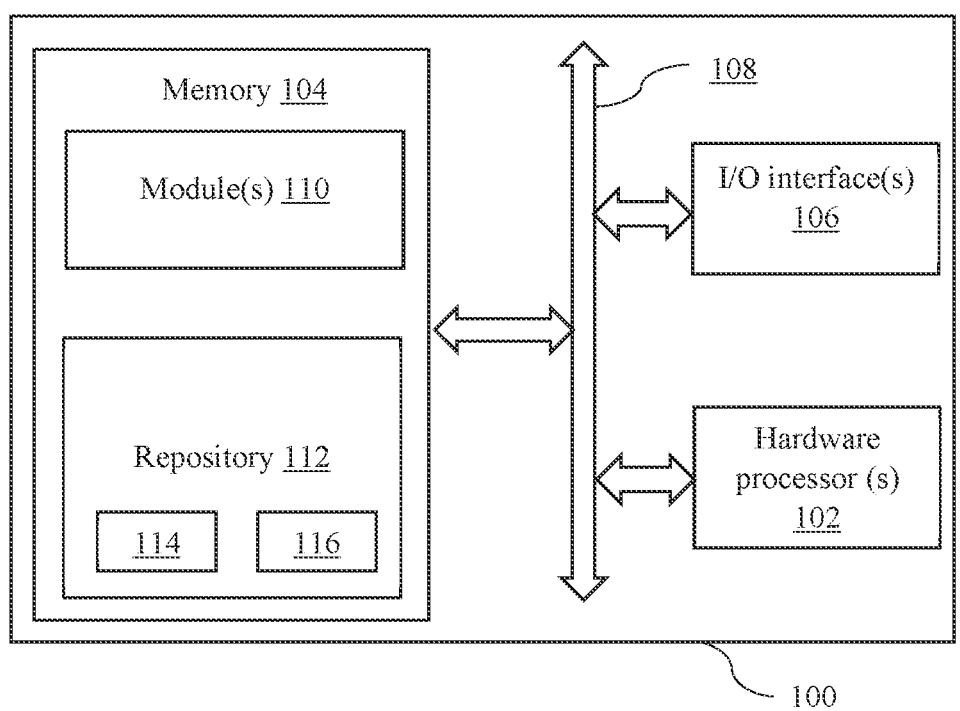
FIG. 1 illustrates a system for generation of descriptive copy of grocery products, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need for an autonomous approach to address the product copy writing techniques, and in generating product captions for products in a retail or E-commerce website. Embodiments of the present disclosure provide a system which utilizes a transformer based deep learning model to generate descriptive copy of grocery products. An autonomous approach towards generating a product description of products in each retail or e-commerce website. The product copies correspond to textual information related to the grocery product.

Referring now to the drawings, and more particularly to FIGS. 1 through 3B, where similar reference characters denote corresponding features consistently throughout the figures, there are shown preferred embodiments and these embodiments are described in the context of the following exemplary system and/or method.

FIG. 1 illustrates a system 100 for generation of the descriptive copy of the grocery products, according to some embodiments of the present disclosure. In an embodiment, the system 100 includes one or more processor(s) 102, communication interface device(s) or input/output (I/O) interface(s) 106, and one or more data storage devices or memory 104 operatively coupled to the one or more processors 102. The memory 104 includes a database. The one or more processor(s) processor 102, the memory 104, and the I/O interface(s) 106 may be coupled by a system bus such as a system bus 108 or a similar mechanism. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor(s) 102 is configured to fetch and execute computer-readable instructions stored in the memory 104. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, the database stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Further, the database stores information pertaining to inputs fed to the system 100 and/or outputs generated by the system (e.g., at each stage), specific to the methodology described herein. Herein, the memory for example the memory 104 and the computer program code configured to, with the hardware processor for example the processor 102, causes the system 100 to perform various functions described herein under.

Figure 2:
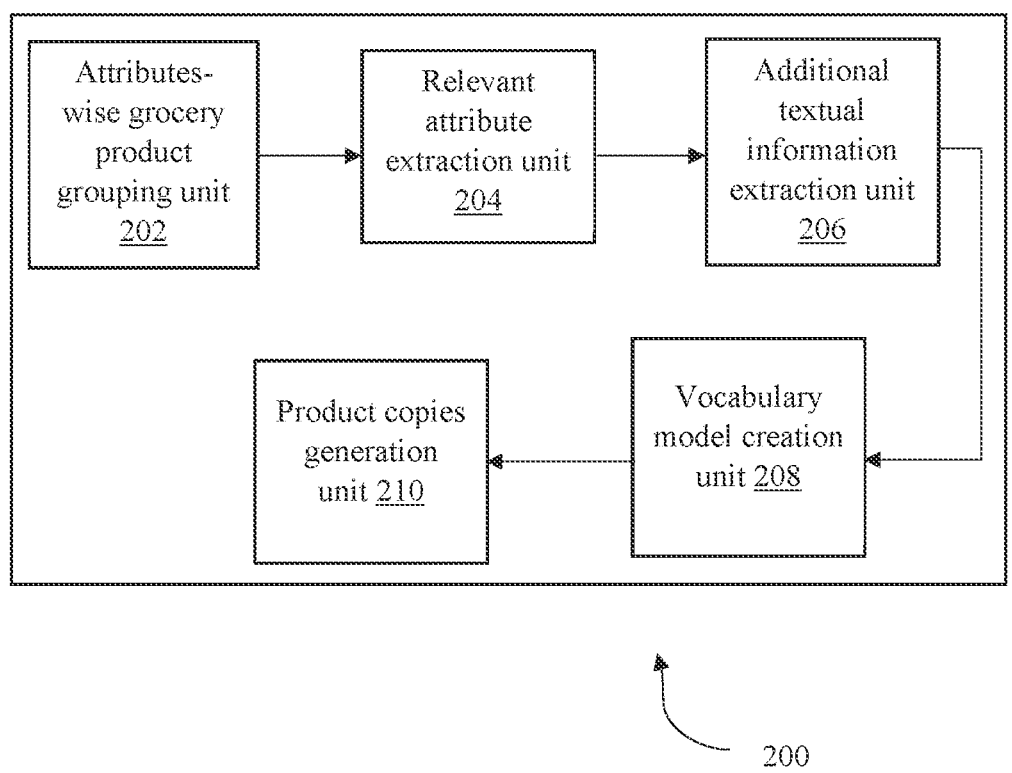
FIG. 2 illustrates an exemplary block diagram of the system of FIG. 1, according to some embodiments of the present disclosure.

FIG. 2 illustrates an exemplary block diagram of the system 100 of FIG. 1, according to some embodiments of the present disclosure. The system 200 may be an example of the system 100 (FIG. 1). In an example embodiment, the system 200 may be embodied in, or is in direct communication with the system, for example the system 100 (FIG. 1). The system 200 includes an attributes wise grocery product grouping unit 202, a relevant attribute extraction unit 204, an additional textual information extraction unit 206, a vocabulary model creation unit 208, and a product copies generation unit 210. The system 200 is configured to receive data associated with one or more grocery products as an input. The data associated with the one or more grocery products corresponds to (a) a product title, (b) a product description, and (c) an additional text information. The additional text information associated with the one or more grocery products corresponds to description on an image of the one or more grocery products. The input data is preprocessed to clean one or more texts. For example, preprocessing involves removing nulls, lowercasing the text, removing special characters, removing geographical information, etc.

The attributes-wise grocery product grouping unit 202 is configured to process the data associated with the one or more grocery products to obtain one or more sorted similar grocery products. The one or more sorted similar grocery products is sorted by implementing a hierarchical clustering technique to group one or more similar grocery products based on one or more attributes. For example: 'breads and buns' are attribute wise similar, in terms of ingredients, texture and at times the way of consumption; and preparation like burger or sandwich. Similarly, some other considerations apart from breads and buns are: 'muffins and cupcakes', 'all whole cakes', 'canned food and processed food', 'all cereals', 'curd and yogurt' etc. The hierarchical clustering technique is utilized to segregate larger set of food items into one or more buckets to arrive at a set of relevant attributes of each.

The relevant attribute extraction unit 204 is configured to extract (a) one or more relevant attributes associated with each of the sorted similar grocery products from the one or more sorted similar grocery products, and (b) an allergen information associated with the one or more sorted similar grocery products. The allergen information associated with the one or more sorted similar grocery products corresponds to (a) sulfites, (b) a color, and (c) food additives. The one or more relevant attributes is extracted by a semi-supervised algorithm co-extraction and maximization algorithm. One or more relevant terms associated with each of the sorted similar grocery products is extracted. For example: All canned food includes attributes associated with packaging of items, preservatives information, shelf-life information, etc. For example: 'Breads and Buns' include common attributes such as baked, oven-fresh, sandwich, burger, brown, milk, white, granary and seeded etc. Some common ingredients such as flour, yeast extract, water, salt, vegetable oil or other oil, fructose corn syrup (2-7%), vinegar etc. Additionally, common allergens and additive components like gluten, dough conditioners, sucrose, sugar, monoglycerides, peroxides, iodates etc.

The additional textual information extraction unit 206 is configured to extract the additional textual information from the image of with all dimensions of the one or more grocery products by using an optical character recognition (OCR) based algorithm. For example: In an image of a bread item, 'Brand A' own honey wheat bread, the pack include some additional information like: 'No. 1 Selling Bread Brand', 'Low fat bread', 'Cholesterol free' and 'Zero-gram Trans Fat'. The details might not be present anywhere in the textual data available. Hence, the image extractions can add more information to the generated descriptions. The OCR technique can pull out image-based attributes/information for a bucketed item.

The vocabulary model creation unit 208 is configured to create a vocabulary model based on (a) the one or more relevant attributes associated with each of the sorted similar grocery products from the one or more sorted similar grocery products, and (b) the allergen information associated with the one or more sorted similar grocery products. One or more weights are assigned to a training data. The vocabulary model is trained by a generative pretrained transformer model (GPT-2) to obtain the training data based on the data associated with the one or more grocery products. The GPT-2 is a decoder-based transformer model that summarizes text, writes articles, paragraphs of newspaper or novels, and writes captions for a given item. In an embodiment, <START> and <END> tags are added to each line of the training data to separate each sentence from one another to separate out each product level information from one another. Based on the vocabulary model, understanding 'where to start' and 'where to stop' and processing the information of each grocery product. For example: An entry of the training set would look like "Brand B" Black Tea Bags. A refreshing cup of tea is nearly impossible if not the "Brand B" tea, caffeine free, contains tannin, refreshing beverage.

The one or more weights are randomly assigned to the trained data, as an outcome of probability calculation for an accurate match with the vocabulary model.

$$W_1x_1, W_2x_2, W_3x_3 \ldots W_nx_n \quad (1)$$

Where $w_1, w_2, w_3, \ldots, w_n$ are individual weights assigned to each vector representation of the product title and the product description in combination. Each combination of the product title and the product description are converted to corresponding equivalent vectors.

Where $x_1, x_2, x_3, \ldots, x_n$ are the vector representation of each training input to the vocabulary model.

$$P(w, w_1, \ldots k) = p_k j = 1 p(w, w_j) \quad (2)$$

$$ci(w, \ldots k; w) = \log P(w, w_1, \ldots k)(\lambda * p_k j = 1 p(w_j)) * ((\lambda - 1) * p(w)) \quad (3)$$

where ci→cumulative information
$w_i$ is an attribute value;
w is an attribute;
$p(w_j)$ is a highest conditional probability;
$p(w, w_j)$ is a highest probability given an attribute;
$\lambda$ is a user-specified parameter, $0 < \lambda < 1$.

$$T_d = E_{i=1}^n P_t P_d \quad (4)$$

Where $T_d$ is a training data;
$P_t$ is a product title;
$P_d$ is a product description.

In an embodiment, each sequence of words then obtains a probability of occurrence determined by training of the vocabulary model on the training data.

The vocabulary model is validated based on the one or more assigned weights on the training data to obtain an accurate match of a content of the vocabulary model. The product copies generation unit 210 is configured to generate one or more descriptive copies associated with the grocery product by mapping the validated vocabulary model with the training data based on a prompt received with the data as the input. In an embodiment, the vocabulary model prompts for an input. The input is a product name or title from a test set that includes similar items, not seen by the algorithm during a training phase. Based on the given input, recalls the training information, and matches the input data with corresponding vocabulary model. The terms or words having a highest probability, or a relevancy forms a part of the generated description along with the recalled training information. With the input, the model generates a suitable caption or description. The vocabulary model aids the algorithm to fetch each word of the generated caption, based on probabilistic calculations around the input words given.

For example: Input Prompt is 'Brand C Brown Bread Loaf'. The model recalls all the training information related to 'Brand C', 'brown bread', 'loaf' and 'brown bread loaf'. Once recalled, retrieves closest vectors from the vocabulary model. The vectors are converted to words by a decoder unit of the vocabulary model. For example: for a given prompt above, the related words that could be pulled out from the vocabulary are: 'Wheat Flour', 'Gluten free', 'unsweetened', 'yeast extract', 'water', 'no high', 'fructose', 'corn syrup' 'healthy' etc. Using these words, the model frames one or more sensible sentences around the given prompt, such as 'Healthy brown bread cut into loaves. Made of wheat flour and is absolutely gluten free. Its unsweetened and contains no high fructose corn syrup.'

Figure 3A:
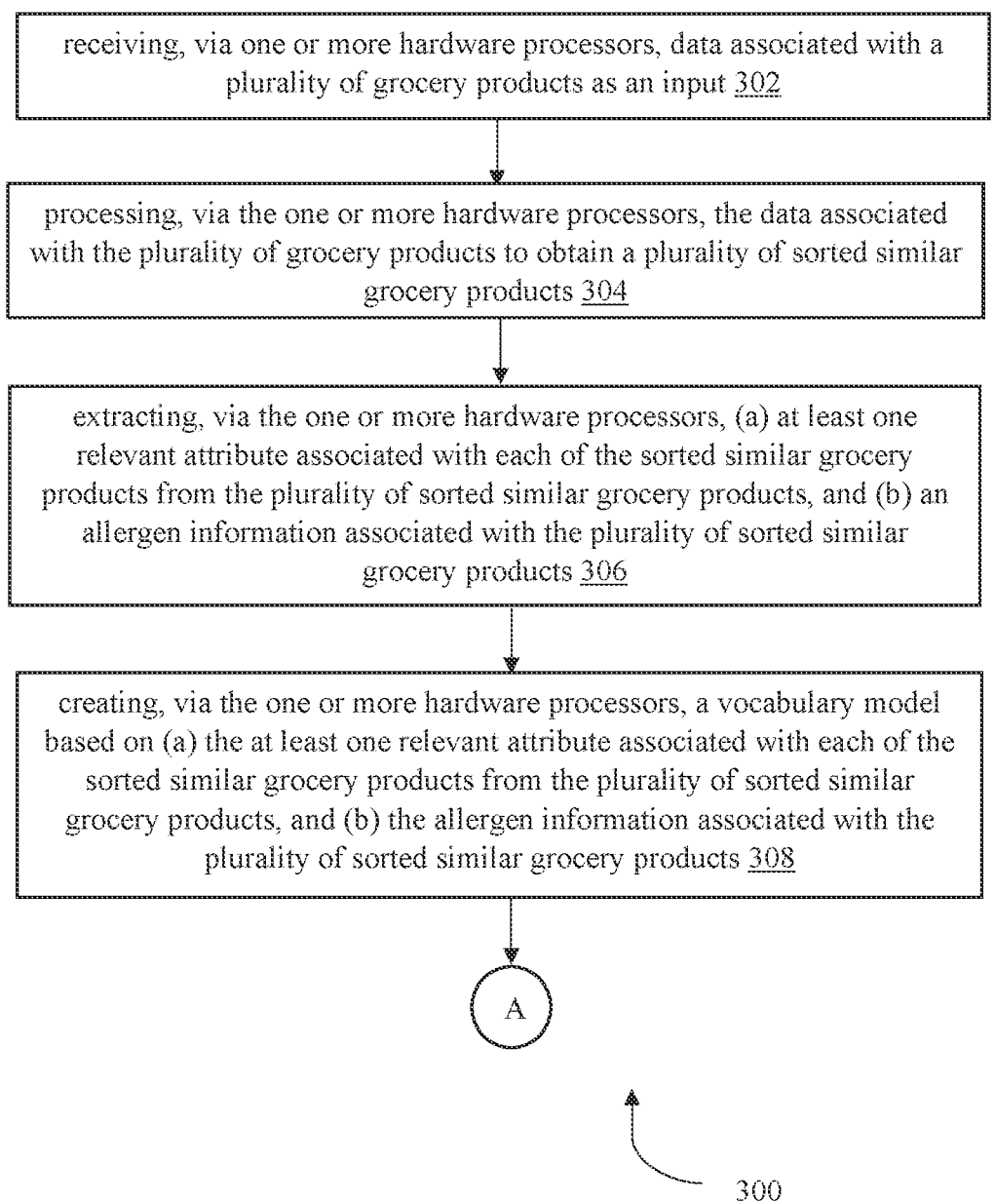
FIG. 3A and FIG. 3B are exemplary flow diagrams illustrating a method of generating descriptive copy of the grocery products, according to an embodiment of the present disclosure.
Figure 3B:
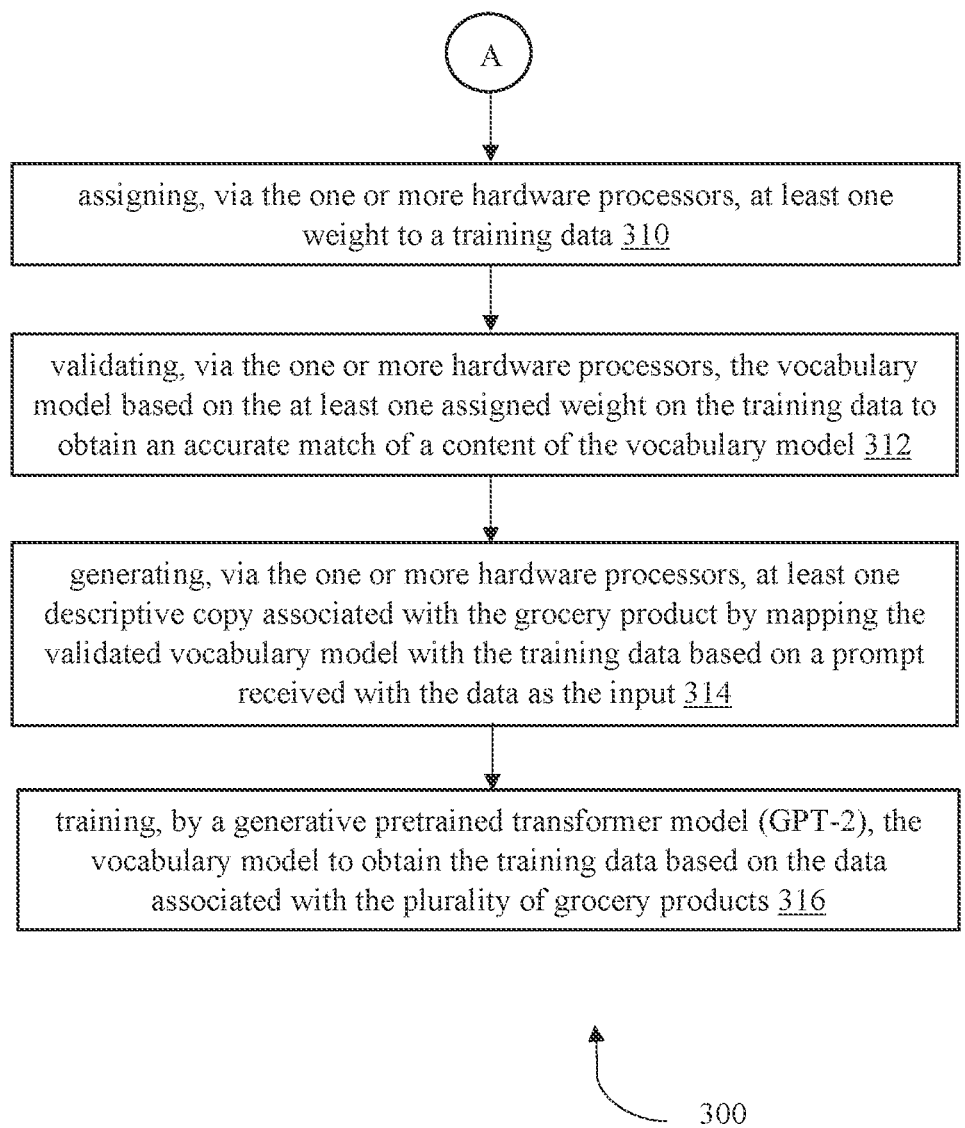

FIG. 3A and FIG. 3B are exemplary flow diagrams illustrating method 300 of generating the descriptive copy of the grocery products, according to an embodiment of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description. The steps of the method of the present disclosure will now be explained with reference to the components of the system as depicted in FIGS. 1 and 2.

At step 302, data associated with one or more grocery products is received as an input. The data associated with the one or more grocery products corresponds to (a) a product title, (b) a product description, and (c) the additional text information. The additional text information associated with the one or more grocery products corresponds to description on an image of the one or more grocery products. At step 304, the data associated with the one or more grocery products is processed to obtain one or more sorted similar grocery products. The one or more sorted similar grocery products is sorted based on one or more attributes. The one or more attributes corresponds to (a) a color, (b) ingredients, (c) flavors, and (d) texture of the grocery product. At step 306, (a) one or more relevant attributes associated with each of the sorted similar grocery products is extracted from the one or more sorted similar grocery products, and (b) an allergen information associated with the one or more sorted similar grocery products is extracted. The one or more relevant attributes are extracted based on one or more relevant terms associated with each of the sorted similar grocery products. The allergen information associated with the one or more sorted similar grocery products corresponds to (a) sulfites, (b) a color, and (c) food additives. At step 308, a vocabulary model is created based on (a) the one or more relevant attributes associated with each of the sorted similar grocery products from the one or more sorted similar grocery products, and (b) the allergen information associated with the one or more sorted similar grocery products. At step 310, one or more weights are assigned to a training data. At step 312, the vocabulary model is validated based on the one or more assigned weights on the training data to obtain an accurate match of a content of the vocabulary model. At step 314, one or more descriptive copies associated with the grocery product is generated by mapping the validated vocabulary model with the training data based on a prompt received with the data as the input. At step 316, the vocabulary model is trained by a generative pretrained transformer model (GPT-2) to obtain the training data based on the data associated with the one or more grocery products.

Experimental Results:

For example, a study is conducted to generate a descriptive copy or a caption of the grocery products. The algorithm is first trained with product details derived from title, available descriptions, attributes, images etc. The trained model is validated or tested using a similar but different set of items or unseen data. It is prompted to generate a description with the help of an input.

For example:
Input: 'Brand D' Honey Vanilla Greek Style Yogurt
Actual Caption: The 'Brand D' Honey Vanilla Greek-Style Yogurt is a combination of our fan favorite honey yogurt with a hint of vanilla to create a sweet, creamy delicacy with a rich taste.

Generated Caption: All Taste No Tang. The days of sour, tangy yogurt are over! For years, we've been mastering the art of yogurt, crafting the 'Brand D' to deliver a deliciously tang free experience in every spoonful. And the texture? Super silky smooth!

The embodiment of the present disclosure herein addresses the unresolved problem of generating product captions for grocery items. The embodiment of the present disclosure provides a transformer based deep learning model approach to generate captions for grocery products. The embodiment of the present disclosure can build a context aware vocabulary model to make a general algorithm aware of the data or the context. Also, combining the process of weight initialization to the model's training data with the context aware model provides an accurate generation of outputs. The vocabulary model enables the algorithm to understand the subject matter and fetch suitable words based on probability for completing each sentence of the generated caption. Initializing weights to the data increases the sharpness or steepness of the inputs during the training phase. The weights assigned to the training data guides the algorithm to pick the important information from the training data. The time spent in writing a copy by a human copy writer, is saved. Reduces research time to an extent i.e., a lot of time spent in understanding the product for writing a good description. The embodiment of the present disclosure can generate multiple captions for a product and the most suitable can be chosen for the product under consideration. The generated captions are as good as human written copies.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method (300), comprising:
   receiving, via one or more hardware processors, data associated with a plurality of grocery products as an input (302);
   processing, via the one or more hardware processors, the data to obtain a plurality of sorted similar grocery products, wherein the plurality of sorted similar grocery products is sorted based on a plurality of attributes (304);
   extracting, via the one or more hardware processors, (a) at least one relevant attribute associated with each of the sorted similar grocery products from the plurality of sorted similar grocery products, and (b) an allergen information associated with the plurality of sorted similar grocery products (306);
   creating, via the one or more hardware processors, a vocabulary model based on (a) the at least one relevant attribute associated with each of the sorted similar grocery products from the plurality of sorted similar grocery products, and (b) the allergen information associated with the plurality of sorted similar grocery products (308);

assigning, via the one or more hardware processors, at least one weight to a training data (310), wherein assigning the at least one weight to the training data increases sharpness or steepness of inputs during a training phase and the at least one weight assigned to the training data directs to select important information from the training data;

adding, via the one or more hardware processors, <START> and <END> tags to each line of the training data to separate each sentence from one another to separate out each product level information from one another, wherein based on the tags, the vocabulary model understands where to start and where to stop and processing the product level information of each grocery product;

validating, via the one or more hardware processors, the vocabulary model based on the at least one assigned weight on the training data to obtain an accurate match of a content of the vocabulary model (312); and generating, via the one or more hardware processors, at least one descriptive copy associated with the grocery product by mapping the validated vocabulary model with the training data based on a prompt received with the data as the input (314), wherein the vocabulary model prompts for the input and the input is a product name or a product title from a test set that includes similar items, unseen during the training phase, wherein the at least one descriptive copy associated with the grocery product is generated by recalling the training information based on the prompted input data, and upon recalling, closest vectors are retrieved from the vocabulary model, the vectors are converted to words by a decoder unit of the vocabulary model, and matching the input data with a corresponding vocabulary model and using the words for framing one or more sentences around the prompted input data, wherein the words having a highest probability, or a relevancy forms a part of the generated at least one descriptive copy along with the recalled training information, and wherein the vocabulary model aids to fetch each word of the generated at least one descriptive copy, based on probabilistic calculations around the prompted input words.

2. The processor implemented method (300) as claimed in claim 1, wherein data associated with the plurality of grocery products corresponds to (a) a product title, (b) a product description, and (c) an additional text information, wherein the additional text information associated with the plurality of grocery products corresponds to description on an image of the plurality of grocery products, and wherein the data is preprocessed to clean one or more texts by removing nulls, lowercasing the text, removing special characters, removing geographical information.

3. The processor implemented method (300) as claimed in claim 1, wherein the plurality of attributes corresponds to (a) a color, (b) ingredients, (c) flavors, and (d) texture of the grocery product.

4. The processor implemented method (300) as claimed in claim 1, wherein the at least one relevant attribute is extracted based on a plurality of relevant terms associated with each of the sorted similar grocery products, and wherein the allergen information associated with the plurality of sorted similar grocery products corresponds to (a) sulfites, (b) a color, and (c) food additives.

5. The processor implemented method (300) as claimed in claim 1, further comprising, training, by a generative pre-trained transformer model (GPT-2), the vocabulary model to obtain the training data based on the data associated with the plurality of grocery products (316).

6. A system (100), comprising:
a memory (104) storing instructions;
one or more communication interfaces (106); and
one or more hardware processors (102) coupled to the memory (104) via the one or more communication interfaces (106), wherein the one or more hardware processors (102) are configured by the instructions to:
receive, data associated with a plurality of grocery products as an input;
process, the data to obtain a plurality of sorted similar grocery products, wherein the plurality of sorted similar grocery products is sorted based on a plurality of attributes;
extract, (a) at least one relevant attribute associated with each of the sorted similar grocery products from the plurality of sorted similar grocery products, and (b) an allergen information associated with the plurality of sorted similar grocery products;
create, a vocabulary model based on (a) the at least one relevant attribute associated with each of the sorted similar grocery products from the plurality of sorted similar grocery products, and (b) the allergen information associated with the plurality of sorted similar grocery products;
assign, at least one weight to a training data, wherein assigning the at least one weight to the training data increases sharpness or steepness of inputs during a training phase and the at least one weight assigned to the training data directs to select important information from the training data;
add <START> and <END> tags to each line of the training data to separate each sentence from one another to separate out each product level information from one another, wherein based on the tags, the vocabulary model understands where to start and where to stop and processing the product level information of each grocery product;
validate, the vocabulary model based on the at least one assigned weight on the training data to obtain an accurate match of a content of the vocabulary model; and
generate, at least one descriptive copy associated with the grocery product by mapping the validated vocabulary model with the training data based on a prompt received with the data as the input, wherein the vocabulary model prompts for the input and the input is a product name or a product title from a test set that includes similar items, unseen during the training phase, wherein the at least one descriptive copy associated with the grocery product is generated by recalling the training information based on the prompted input data, and upon recalling, closest vectors are retrieved from the vocabulary model, the vectors are converted to words by a decoder unit of the vocabulary model, and matching the input data with a corresponding vocabulary model and using the words for framing one or more sentences around the prompted input data, wherein the words having a highest probability, or a relevancy forms a part of the generated at least one descriptive copy along with the recalled training information, and wherein the vocabulary model aids to fetch each word of the generated at least one descriptive copy, based on probabilistic calculations around the prompted input words.

7. The system (100) as claimed in claim 6, wherein the data associated with the plurality of grocery products corresponds to (a) a product title, (b) a product description, and (c) an additional text information, and wherein the additional text information associated with the plurality of grocery products corresponds to description on an image of the plurality of grocery products, and wherein the data is preprocessed to clean one or more texts by removing nulls, lowercasing the text, removing special characters, removing geographical information.

8. The system (100) as claimed in claim 6, wherein the plurality of attributes corresponds to (a) a color, (b) ingredients, (c) flavors, and (d) texture of the grocery product.

9. The system (100) as claimed in claim 6, wherein the at least one relevant attribute is extracted based on a plurality of relevant terms associated with each of the sorted similar grocery products, and wherein the allergen information associated with the plurality of sorted similar grocery products corresponds to (a) sulfites, (b) a color, and (c) food additives.

10. The system (100) as claimed in claim 6, wherein the one or more hardware processors (102) are further configured by the instructions to train, by a generative pretrained transformer model (GPT-2), the vocabulary model to obtain the training data based on the data associated with the plurality of grocery products.

11. One or more non-transitory machine-readable information storage mediums comprising one or more instructions which when executed by one or more hardware processors causes:
  receiving, data associated with a plurality of grocery products as an input;
  processing, the data to obtain a plurality of sorted similar grocery products, wherein the plurality of sorted similar grocery products is sorted based on a plurality of attributes;
  extracting, (a) at least one relevant attribute associated with each of the sorted similar grocery products from the plurality of sorted similar grocery products, and (b) an allergen information associated with the plurality of sorted similar grocery products;
  creating, a vocabulary model based on (a) the at least one relevant attribute associated with each of the sorted similar grocery products from the plurality of sorted similar grocery products, and (b) the allergen information associated with the plurality of sorted similar grocery products;
  assigning, at least one weight to a training data, wherein assigning the at least one weight to the training data increases sharpness or steepness of inputs during a training phase and the at least one weight assigned to the training data directs to select important information from the training data;
  adding <START> and <END> tags to each line of the training data to separate each sentence from one another to separate out each product level information from one another, wherein based on the tags, the vocabulary model understands where to start and where to stop and processing the product level information of each grocery product;
  validating, the vocabulary model based on the at least one assigned weight on the training data to obtain an accurate match of a content of the vocabulary model; and
  generating, at least one descriptive copy associated with the grocery product by mapping the validated vocabulary model with the training data based on a prompt received with the data as the input, wherein the vocabulary model prompts for the input and the input is a product name or a product title from a test set that includes similar items, unseen during the training phase, wherein the at least one descriptive copy associated with the grocery product is generated by recalling the training information based on the prompted input data, and upon recalling, closest vectors are retrieved from the vocabulary model, the vectors are converted to words by a decoder unit of the vocabulary model, and matching the input data with a corresponding vocabulary model and using the words for framing one or more sentences around the prompted input data, wherein the words having a highest probability, or a relevancy forms a part of the generated at least one descriptive copy along with the recalled training information, and wherein the vocabulary model aids to fetch each word of the generated at least one descriptive copy, based on probabilistic calculations around the prompted input words.

12. The one or more non-transitory machine-readable information storage mediums of claim 11, wherein data associated with the plurality of grocery products corresponds to (a) a product title, (b) a product description, and (c) an additional text information, and wherein the additional text information associated with the plurality of grocery products corresponds to description on an image of the plurality of grocery products, and wherein the data is preprocessed to clean one or more texts by removing nulls, lowercasing the text, removing special characters, removing geographical information.

13. The one or more non-transitory machine-readable information storage mediums of claim 11, wherein the plurality of attributes corresponds to (a) a color, (b) ingredients, (c) flavors, and (d) texture of the grocery product.

14. The one or more non-transitory machine-readable information storage mediums of claim 11, wherein the at least one relevant attribute is extracted based on a plurality of relevant terms associated with each of the sorted similar grocery products, and wherein the allergen information associated with the plurality of sorted similar grocery products corresponds to (a) sulfites, (b) a color, and (c) food additives.

15. The one or more non-transitory machine-readable information storage mediums of claim 11, training, by a generative pretrained transformer model (GPT-2), the vocabulary model to obtain the training data based on the data associated with the plurality of grocery products.

* * * * *